(12) United States Patent
Cui et al.

(10) Patent No.: US 11,954,526 B2
(45) Date of Patent: Apr. 9, 2024

(54) MULTI-QUEUE MULTI-CLUSTER TASK SCHEDULING METHOD AND SYSTEM

(71) Applicant: GUANGDONG UNIVERSITY OF PETROCHEMICAL TECHNOLOGY, Guangdong (CN)

(72) Inventors: Delong Cui, Guangdong (CN); Jianpeng Lin, Guangdong (CN); Zhiping Peng, Guangdong (CN); Qirui Li, Guangdong (CN); Jieguang He, Guangdong (CN); Jinbo Qiu, Guangdong (CN)

(73) Assignee: GUANGDONG UNIVERSITY OF PETROCHEMICAL TECHNOLOGY, Maoming (CN)

( * ) Notice: Subject to any disclaimer, the term of this patent is extended or adjusted under 35 U.S.C. 154(b) by 146 days.

(21) Appl. No.: 17/277,816

(22) PCT Filed: Jul. 10, 2020

(86) PCT No.: PCT/CN2020/101185
§ 371 (c)(1),
(2) Date: Mar. 19, 2021

(87) PCT Pub. No.: WO2022/006830
PCT Pub. Date: Jan. 13, 2022

(65) Prior Publication Data
US 2022/0269536 A1    Aug. 25, 2022

(51) Int. Cl.
G06F 9/48    (2006.01)
G06N 3/045   (2023.01)

(52) U.S. Cl.
CPC .......... *G06F 9/4893* (2013.01); *G06N 3/045* (2023.01)

(58) Field of Classification Search
None
See application file for complete search history.

(56) References Cited

U.S. PATENT DOCUMENTS

2019/0362227 A1* 11/2019 Seshadri ............... G06N 3/063
2020/0067637 A1*  2/2020 Wang .................... H03M 13/09
(Continued)

FOREIGN PATENT DOCUMENTS

CN    110351348 A    10/2019
CN    110580196 A    12/2019
(Continued)

*Primary Examiner* — Adam Lee
(74) *Attorney, Agent, or Firm* — Fish IP Law, LLP (57) ABSTRACT

The present disclosure provides a multi-queue multi-cluster task scheduling method and system. The method includes: constructing a training data set; training and optimizing a plurality of parallel deep neural networks (DNN) by using the training data set to obtain a plurality of trained and optimized parallel DNNs; setting a reward function, where the reward function minimizes the sum of a task delay and energy consumption by adjusting a reward value proportion of the task delay and a reward value proportion of the energy consumption; inputting a to-be-scheduled state space into the plurality of trained and optimized parallel DNNs to obtain a plurality of to-be-scheduled action decisions; determining an optimal action decision among the plurality of to-be-scheduled action decisions based on the reward function for output; and scheduling the plurality of task attribute groups to a plurality of clusters based on the optimal action decision.

12 Claims, 4 Drawing Sheets

(56) References Cited

U.S. PATENT DOCUMENTS

| | | | |
|---|---|---|---|
| 2020/0160171 A1* | 5/2020 | Rangarajan | G06F 8/451 |
| 2020/0265331 A1* | 8/2020 | Tashman | G06N 7/01 |
| 2021/0027107 A1* | 1/2021 | Pekelny | G06N 3/045 |

FOREIGN PATENT DOCUMENTS

| | | | |
|---|---|---|---|
| CN | 110737529 A | 1/2020 | |
| CN | 110768827 A | 2/2020 | |
| CN | 111158912 A | 5/2020 | |
| CN | 111722910 A | 9/2020 | |

\* cited by examiner

MULTI-QUEUE MULTI-CLUSTER TASK SCHEDULING METHOD AND SYSTEM

CROSS REFERENCE TO RELATED APPLICATIONS

This patent application claims the benefit and priority of PCT Application No. PCT/CN2020/101185, filed on Jul. 10, 2020, the disclosure of which is incorporated by reference herein in its entirety as part of the present application.

TECHNICAL FIELD

The present disclosure relates to the technical field of cloud computing, and in particular, to a multi-queue multi-cluster task scheduling method and system.

BACKGROUND

In a current cloud computing environment, data centers built by, for example, Amazon, IBM, Microsoft, and Yahoo each include hundreds of thousands of servers, and Google has even more than 1 million servers. The number of servers is even larger after various physical resources are virtualized. In this case, breakdown and dynamic joining and withdrawals etc. of physical nodes and virtualized units occasionally occur, leading to high technical difficulty and complexity of management. For another example, in a multi-layer Web service workflow, a law of load changes caused by emergencies is usually unpredictable. From the perspective of task optimization and assignment, scheduling of various types of cloud workflow tasks on a plurality of processing units was proven to be an NP-complete problem. From the perspective of resource optimization and supply, on the one hand, energy consumption needs to be considered for virtual unit arrangement. To be specific, the number of activated physical servers and the number of used network devices need to be reduced. In this case, the virtual unit arrangement can be abstracted as a boxing problem, which is an NP-complete problem. On the other hand, it is necessary to consider data transmission between virtual units, that is, to reduce use of network bandwidth. In this case, the virtual unit arrangement can be abstracted as a quadratic assignment problem, which is also an NP-complete problem.

A cloud service provider and demander negotiate an amount of work to be performed and a service level agreement (SLA). The cloud service provider pays more attention to a resource combination scheme for maximizing resource utilization, thereby minimizing operating costs. A cloud service user pays more attention to a task scheduling method for minimizing the lease time, thereby minimizing payment costs. One of core indicators of the operating costs and the payment costs is energy consumption. In actual cloud task scheduling and resource configuration, there is a conflict between the cloud service provider who aims to minimize energy consumption and the user who pursues optimal service quality. This conflict is reflected as follows: the cloud service user desires to obtain a smaller task delay, whereas the cloud service provider desires to obtain lower energy consumption. In an existing cloud task scheduling and resource configuration method, that is, a multi-queue multi-cluster task scheduling and resource configuration method, optimization can be performed for only one optimization objective. To be specific, an optimal scheduling strategy is generated by using task delay or energy consumption minimization as an optimization objective of a cloud system. Therefore, a relationship between energy consumption and task completion time (that is, the task delay) cannot be effectively balanced based on a specific requirement to minimize the sum of task delay and energy consumption (that is, an optimization target), and generate the optimal scheduling strategy by using task delay and energy consumption minimization as the optimization objective of the cloud system.

SUMMARY

A technical problem to be resolved in the present disclosure is providing a multi-queue multi-cluster task scheduling method and system to generate an optimal scheduling strategy by using task delay and energy consumption minimization as an optimization objective of a cloud system.

To resolve the above technical problem, the present disclosure provides a multi-queue multi-cluster task scheduling method and system.

The multi-queue multi-cluster task scheduling method includes:

step S1: constructing a training data set, where the training data set includes a state space and an action decision that are in one-to-one correspondence, the state space includes a plurality of task attribute groups in a plurality of queues arranged in sequence, and the task attribute group includes a data amount of a task and the number of CPU cycles required by the task;

step S2: training and optimizing a plurality of parallel deep neural networks (DNN) by using the training data set to obtain a plurality of trained and optimized parallel DNNs;

step S3: setting a reward function, where the reward function minimizes the sum of a task delay and energy consumption by adjusting a reward value proportion of the task delay and a reward value proportion of the energy consumption;

step S4: inputting a to-be-scheduled state space into the plurality of trained and optimized parallel DNNs to obtain a plurality of to-be-scheduled action decisions;

step S5: determining an optimal action decision among the plurality of to-be-scheduled action decisions based on the reward function for output; and step S6: scheduling the plurality of task attribute groups to a plurality of clusters based on the optimal action decision.

Optionally, the method further includes:

step S7: storing the to-be-scheduled state space and the optimal action decision as a sample in a replay memory, and repeatedly performing steps S4 to S7 until the number of samples in the replay memory reaches a threshold;

step S8: randomly selecting a predetermined number of samples from the replay memory, and further training and optimizing the plurality of trained and optimized parallel DNNs to obtain a plurality of further trained and optimized parallel DNNs; and step S9: updating the plurality of trained and optimized parallel DNNs in step S4 to the plurality of further trained and optimized parallel DNNs.

Optionally, the setting a reward function specifically includes:

step S31: adding time consumed by a transmission process of each task and time consumed by a computation process of the task to obtain a task delay of each task;

step S32: determining a maximum task delay among all task delays;

step S33: adding energy consumed in transmission processes of all tasks and energy consumed in computation processes of all tasks to obtain energy consumption of all tasks;

step S34: setting a first reward value proportion of the task delay and a second reward value proportion of the energy consumption, where the sum of the first reward value proportion and the second reward value proportion is 1; and step S35: setting the reward function based on the maximum task delay, the first reward value proportion, the energy consumption, and the second reward value proportion.

Optionally, the setting the reward function based on the maximum task delay, the first reward value proportion, the energy consumption, and the second reward value proportion specifically includes:

step S351: multiplying the maximum task delay and the first reward value proportion to obtain a first product;

step S352: multiplying the energy consumption and the second reward value proportion to obtain a second product; and step S353: adding the first product and the second product to obtain the reward function.

Optionally, the determining an optimal action decision among the plurality of to-be-scheduled action decisions based on the reward function for output specifically includes:

step S51: calculating a reward function value of each to-be-scheduled action decision based on the reward function;

step S52: selecting a minimum reward function value among all reward function values; and step S53: selecting a to-be-scheduled action decision corresponding to the minimum reward function value as the optimal action decision for output.

Optionally, after the scheduling the plurality of task attribute groups to a plurality of clusters based on the optimal action decision, the method further includes:

Step S10: equally distributing the number of CPU cycles of each cluster to all task attribute groups in the cluster.

The multi-queue multi-cluster task scheduling system includes:

a training data set construction module, configured to constructs a training data set, where the training data set includes a state space and an action decision that are in one-to-one correspondence, the state space includes a plurality of task attribute groups in a plurality of queues arranged in sequence, and the task attribute group includes a data amount of a task and the number of CPU cycles required by the task;

a training and optimization module, configured to train and optimize a plurality of parallel deep neural networks (DNN) by using the training data set to obtain a plurality of trained and optimized parallel DNNs;

a reward function setting module, configured to set a reward function, where the reward function minimizes the sum of a task delay and energy consumption by adjusting a reward value proportion of the task delay and a reward value proportion of the energy consumption;

an action decision obtaining module, configured to input a to-be-scheduled state space into the plurality of trained and optimized parallel DNNs to obtain a plurality of to-be-scheduled action decisions;

an optimal action decision obtaining module, configured to determine an optimal action decision among the plurality of to-be-scheduled action decisions based on the reward function for output; and a scheduling module, configured to schedule the plurality of task attribute groups to a plurality of clusters based on the optimal action decision.

Optionally, the system further includes:

a sample storage module, configured to store the to-be-scheduled state space and the optimal action decision as a sample in a replay memory, where the action decision obtaining module, the optimal action decision obtaining module, the scheduling module, and the sample storage module are executed repeatedly until the number of samples in the replay memory reaches a threshold;

a further training and optimization module, configured to randomly select a predetermined number of samples from the replay memory, and further train and optimize the plurality of trained and optimized parallel DNNs to obtain a plurality of further trained and optimized parallel DNNs; and an updating module, configured to update the plurality of trained and optimized parallel DNNs in the action decision obtaining module to the plurality of further trained and optimized parallel DNNs.

Optionally, the reward function setting module specifically includes:

a task delay calculation unit, configured to add time consumed by a transmission process of each task and time consumed by a computation process of the task to obtain a task delay of each task;

a maximum task delay determining unit, configured to determine a maximum task delay among all task delays;

an energy consumption calculation unit, configured to add energy consumed in transmission processes of all tasks and energy consumed in computation processes of all tasks to obtain energy consumption of all tasks;

a reward value proportion setting unit, configured to set a first reward value proportion of the task delay and a second reward value proportion of the energy consumption, where the sum of the first reward value proportion and the second reward value proportion is 1; and a reward function setting unit, configured to set the reward function based on the maximum task delay, the first reward value proportion, the energy consumption, and the second reward value proportion.

Optionally, the reward function setting unit specifically includes:

a first product obtaining subunit, configured to multiply the maximum task delay and the first reward value proportion to obtain a first product;

a second product obtaining subunit, configured to multiply the energy consumption and the second reward value proportion to obtain a second product; and a reward function obtaining subunit, configured to add the first product and the second product to obtain the reward function.

Compared with the prior art, the present disclosure has the following beneficial effects: according to the multi-queue multi-cluster task scheduling method and system disclosed in the present disclosure, a reward function is set in view of a conflict between cloud service providers aiming to minimize energy consumption and users pursuing optimal service quality. The reward function can be used to adjust a reward value proportion of a task delay and a reward value proportion of energy consumption based on a specific requirement, so as to minimize the sum of the task delay and the energy consumption. When it is expected to obtain a smaller task delay, the reward value proportion of the task delay is increased. When it is expected to obtain lower energy consumption, the reward value proportion of the energy consumption is increased. The relationship between the energy consumption and the task delay is effectively balanced by adjusting the reward value proportions of different optimization targets to minimize the sum of the task delay and the energy consumption. In an optimization process, the reward function is used to calculate a reward function value of an action decision output by each deep neural network. An action decision corresponding to the minimum reward function value is selected as an optimal action decision. Multi-queue multi-cluster task scheduling is performed based on the optimal action decision. In this way, the optimal scheduling strategy can be generated by using task delay and energy consumption minimization as the optimization objective of the cloud system.

BRIEF DESCRIPTION OF DRAWINGS

The present disclosure is further described below with reference to the accompanying drawings.

DETAILED DESCRIPTION

Embodiment 1

Figure 1:
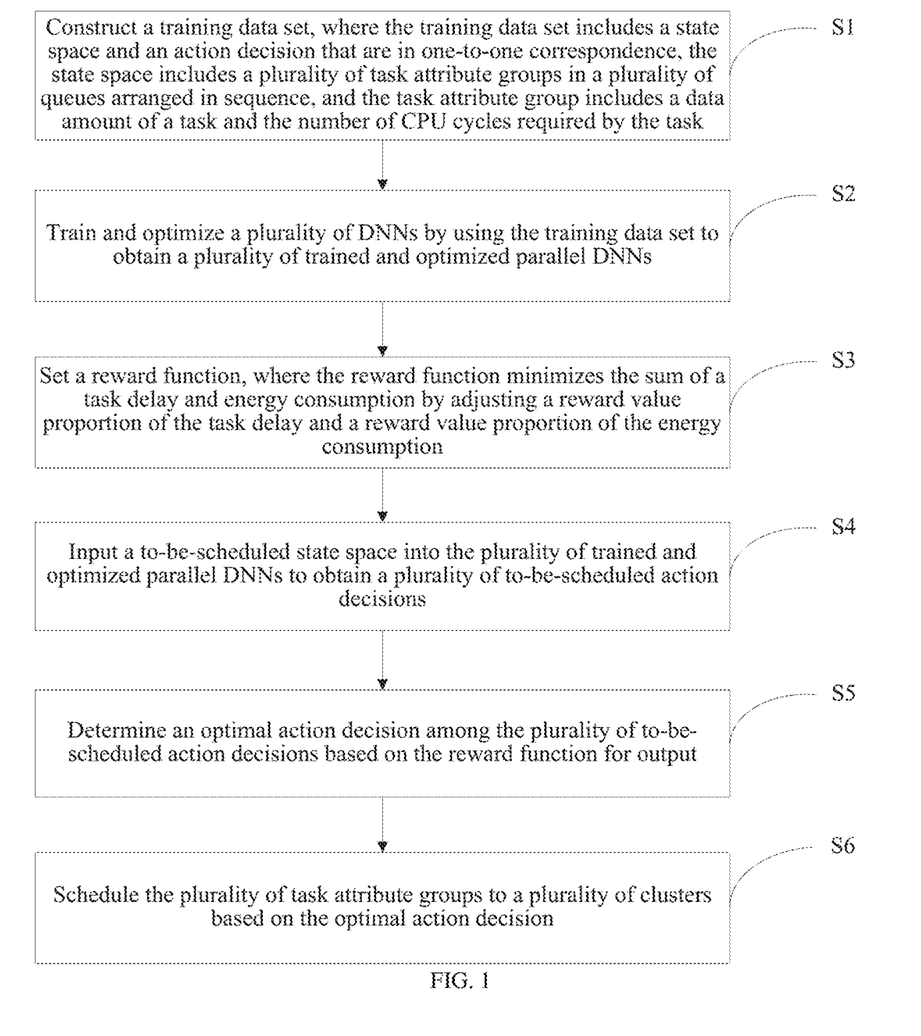
FIG. 1 is a flowchart of a multi-queue multi-cluster task scheduling method according to Embodiment 1 of the present disclosure.

FIG. 1 is a flowchart of a multi-queue multi-cluster task scheduling method according to Embodiment 1 of the present disclosure. As shown in FIG. 1, the multi-queue multi-cluster task scheduling method includes the following steps:
Step S1: construct a training data set, where the training data set includes a state space and an action decision that are in one-to-one correspondence, the state space includes a plurality of task attribute groups in a plurality of queues arranged in sequence, and the task attribute group includes a data amount of a task and the number of CPU cycles required by the task.
Step S2: train and optimize a plurality of parallel deep neural networks (DNN) by using the training data set to obtain a plurality of trained and optimized parallel DNNs.
Step S3: set a reward function, where the reward function minimizes the sum of a task delay and energy consumption by adjusting a reward value proportion of the task delay and a reward value proportion of the energy consumption.
Step S3 specifically includes the following steps:
Step S31: add time consumed by a transmission process of each task and time consumed by a computation process of the task to obtain a task delay of each task.
Step S32: determine a maximum task delay among all task delays.
Step S33: add energy consumed in transmission processes of all tasks and energy consumed in computation processes of all tasks to obtain energy consumption of all tasks.
Step S34: set a first reward value proportion of the task delay and a second reward value proportion of the energy consumption, where the sum of the first reward value proportion and the second reward value proportion is 1.
Step S35: set the reward function based on the maximum task delay, the first reward value proportion, the energy consumption, and the second reward value proportion.
Step S35 specifically includes the following steps:
Step S351: multiply the maximum task delay and the first reward value proportion to obtain a first product.
Step S352: multiply the energy consumption and the second reward value proportion to obtain a second product.
Step S353: add the first product and the second product to obtain the reward function.
Step S4: input a to-be-scheduled state space into the plurality of trained and optimized parallel DNNs to obtain a plurality of to-be-scheduled action decisions.
Step S5: determine an optimal action decision among the plurality of to-be-scheduled action decisions based on the reward function for output.
Step S5 specifically includes the following steps:
Step S51: calculate a reward function value of each to-be-scheduled action decision based on the reward function.
Step S52: select a minimum reward function value among all reward function values.
Step S53: select a to-be-scheduled action decision corresponding to the minimum reward function value as the optimal action decision for output.
Step S6: schedule the plurality of task attribute groups to a plurality of clusters based on the optimal action decision.
After step S6, the method further includes the following step:
Step S10: equally distribute the number of CPU cycles of each cluster to all task attribute groups in the cluster.
The multi-queue multi-cluster task scheduling method further includes the following steps:
Step S7: store the to-be-scheduled state space and the optimal action decision as a sample in a replay memory, and repeatedly perform steps S4 to S7 until the number of samples in the replay memory reaches a threshold.
Step S8: randomly select a predetermined number of samples from the replay memory, and further train and optimize the plurality of trained and optimized parallel DNNs to obtain a plurality of further trained and optimized parallel DNNs.
Step S9: update the plurality of trained and optimized parallel DNNs in step S4 to the plurality of further trained and optimized parallel DNNs.

Embodiment 2

Figure 2:
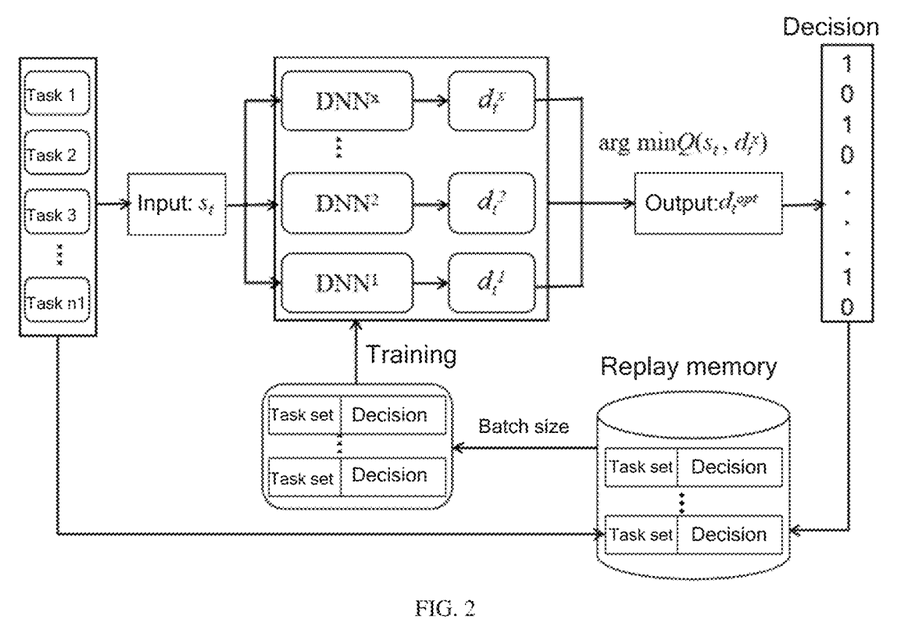
FIG. 2 is a schematic flowchart of a multi-queue multi-cluster task scheduling method according to Embodiment 2 of the present disclosure.

FIG. 2 is a schematic flowchart of a multi-queue multi-cluster task scheduling method according to Embodiment 2 of the present disclosure. As shown in FIG. 2, the multi-queue multi-cluster task scheduling method includes the following steps:
Step 1: initialize network parameters $\theta^x$ of X DNNs and a scale of a replay memory.

θ* denotes a neural network parameter, and it includes a node parameter and a parameter of a connection line between nodes. The replay memory stores a previously obtained strategy. This feature is one of characteristics that distinguish a DNN algorithm from a previous neural network algorithm. The neural network parameter may be randomly initialized.

Step 2: express a plurality of task attribute groups in a plurality of queues as a state space $s_t$, where $s_t$={task$_1$, task$_2$, . . . , task$_{n1}$} and is used as input of the DNNs.

n1 denotes the total number of tasks, that is, the number n of waiting task queues multiplied by the number m of tasks included in each queue, and task$_1$, . . . , task$_{n1}$ denote the plurality of task attribute groups in the plurality of queues arranged in sequence in the state space. Each task attribute group includes a data amount of a task and the number of CPU cycles required by the task.

A task of a cloud system is to schedule atomic tasks in the plurality of queues, that is, the task set in FIG. 2, to a plurality of clusters. It was assumed that there are n waiting task queues in the system, and 1≤n≤N, where N denotes the maximum number of waiting task queues in the system. It was assumed that each queue in the system includes m tasks, and 1≤m≤M, where M denotes the maximum number of tasks included in each queue in the system. In this case, the total number of tasks is m*n. It was assumed that there are k computing clusters, and 1≤k≤K, where K denotes the maximum number of computing clusters in the system.

Task $T_{nm}$ is the m-th task in the n-th queue. An attribute of task $T_{nm}$ may be expressed as ($\alpha_{nm}$, $\beta_{nm}$) by using a 2-tuple, where $\alpha_{nm}$ denotes a data amount of the m-th task in the n-th queue, and $\beta_{nm}$ denotes the number of CPU cycles required by the m-th task in the n-th queue. In addition, it was assumed that the number of CPU cycles required by each task is linearly related to the data amount of the task. That is, $\beta_{nm}$=q*$\alpha_{nm}$, where q denotes a computation-to-data ratio.

An attribute of cluster $J_k$ may be expressed as ($C_k$, $P_k^{comm}$, $P_k^{comp}$) by using a triplet, where $C_k$ denotes a computation capability of cluster k, that is, the number of CPU cycles; $P_k^{comm}$ denotes communication power consumption of cluster k; and $P_k^{comp}$ denotes computation power consumption of cluster k.

In addition, bandwidth between the plurality of queues and the plurality of clusters may be expressed as {$w_{12}$, . . . , $w_{nk}$}, where $w_{nk}$ denotes bandwidth between queue n and cluster k.

Step 3: each DNN outputs different action decisions ($d_1$, $d_2$, . . . , $d_x$), where $d_x$ denotes an action decision output by the X-th DNN.

The action decision specifies a cluster to which the task is scheduled. The action decision is also referred to as a scheduling strategy.

Step 4: calculate a Q value corresponding to each action decision, and select an action decision corresponding to the minimum Q value as an optimal action decision of the task set:

$$d_{opt} = \arg\min_{x \in X} Q(s, d_x)$$

In the formula, s denotes a state space of the current task set, that is, state space $s_t$={task$_1$, task$_2$, . . . , task$_{n1}$} in step 2; and $d_{opt}$ denotes the optimal action decision corresponding to state space $s_t$={task$_1$, task$_2$, . . . , task$_{n1}$}.

Two key factors, namely task delay and energy consumption, in a scheduling process are mainly considered in this embodiment. Definitions of a communication model and a computation model mentioned in this embodiment are illustrated below by using formulas.

The communication model includes time and energy consumption required for task data transmission. When a plurality of tasks in the same queue are scheduled to the same cluster at the same time, bandwidth is equally distributed to each task. Therefore, bandwidth $R_{nm}^{bw}$ occupied by task m in queue n is as follows:

$$R_{nm}^{bw} = \frac{w_{nk}}{A_{nk}}$$

In the formula, $w_{nk}$ denotes bandwidth between queue n to cluster k, and $A_{nk}$ denotes the number of tasks scheduled to cluster k in queue n.

Communication delay $T^{comm}$ is time consumed for uploading task data to a server:

$$T_{nm}^{comm} = \frac{\alpha_{nm}}{R_{nm}^{bw}}$$

In the formula, $T_{nm}^{comm}$ denotes time consumed for uploading task m in queue n to the server, and $\alpha_{nm}$ denotes the data amount of task m in queue n.

Communication energy consumption $E^{comm}$ is energy consumed in a transmission process of a task:

$$E_{nm}^{comm} = P_k^{comm} \cdot T_{nm}^{comm}$$

In the formula, $E_{nm}^{comm}$ denotes energy consumed in a transmission process of task m in queue n, and $P_k^{comm}$ denotes power consumed for transmission of a unit task (for example, 1 MB).

Communication energy consumption $E_n^{comm}$ of all tasks in queue n is as follows:

$$E_n^{comm} = \sum_{m \in M} E_{nm}^{comm}$$

The computation model includes a computation delay and computation energy consumption of a task. A computation capability of a cluster is equally distributed to tasks scheduled to the cluster, that is, each task obtains CPU cycles:

$$R_{nm}^{cpu} = \frac{C_k}{\Sigma_{n \in N} \Sigma_{m \in M} a_{nmk}}$$

In the formula, $R_{nm}^{cpu}$ denotes a CPU cycle obtained by task m in queue n, and $\alpha_{nmk}$ denotes the data amount of task m scheduled to cluster k in queue n.

Computation delay $T^{comp}$ is time consumed for task computation:

$$T_{nm}^{comp} = \frac{\beta_{nm}}{R_{nm}^{cpu}}$$

In the formula, $T_{nm}^{comp}$ denotes time consumed by computation for task m in queue n.

Computation energy consumption $E^{comp}$ is energy consumed in a computation process of a task:

$$E_{nm}^{comp} = P_k^{comp} \cdot T_{nm}^{comp}$$

In the formula, $E_{nm}^{comp}$ denotes energy consumed in a computation process of task m in queue n.

Computation energy consumption $E_n^{comp}$ of all tasks in queue n is as follows:

$$E_n^{comp} = \sum_{m \in M} E_{nm}^{comp}$$

The factors considered in this embodiment are the task delay and the energy consumption. Therefore, a reward function of the system, that is, the Q value, is defined as follows:

$$Q(s, d) = \xi^d \max_{n \in N, m \in M} (T_{nm}^{comm} + T_{nm}^{comp}) + \xi^e \sum_{n \in N} (E_n^{comm} + E_n^{comp})$$

In the formula, $\xi^d$ denotes an optimization proportion of the task delay, $\xi^e$ denotes an optimization proportion of the energy consumption, $\xi^d \in [0,1]$, $\xi^e \in [0,1]$, and $\xi^d + \xi^e = 1$. The two parameters $\xi^d$ and $\xi^e$ may be adjusted as required. To be specific, if it is more expected to obtain a smaller task delay in the present disclosure, $\xi^d$ is increased; otherwise, $\xi^e$ is increased. d denotes an action decision output by a DNN.

$$Q(s, d) = \xi^d \max_{n \in N, m \in M} (T_{nm}^{comm} + T_{nm}^{comp}) + \xi^e \sum_{n \in N} (E_n^{comm} + E_n^{comp})$$

may be set based on a specific requirement to minimize the sum of the task delay and the energy consumption, that is, minimize the optimization target.

An ultimate optimization objective of the system is to obtain an optimal scheduling strategy. After the DNN makes an action decision, the action decision corresponding to the minimum Q value may be obtained based on formula $$d_{opt} = \arg \min_{x \in X} Q(s, d_x)$$

as the optimal action decision of the task set, so as to obtain the optimal scheduling strategy and minimize the task delay and the energy consumption, that is, minimize expected reward value R:

$$R = \min Q(s,d)$$

An optimization process of the system is a process of training the scheduling model. The scheduling model includes a plurality of heterogeneous DNNs. The optimization process of the system includes the following:

First, the plurality of task attribute groups in the plurality of queues are expressed as state space s, that is, $\{\alpha_{11}, \beta_{11}, \alpha_{12}, \beta_{12}, \ldots, \alpha_{nm}, \beta_{nm}\}$. The state space is used as input of the X DNNs. Each DNN outputs different action decisions $(d^1, d^2, \ldots, d^x)$, where $d^x$ denotes the action decision output by the Xth DNN. In time step t, system state $s_t$ is used as input to output action decision $d_t^x$ of each DNN, which is expressed as follows:

$$f_{\theta_t^b}: s_t \to d_t^x$$

$f_{\theta_t^b}$ is a function of a parameter of the bth DNN. The action decision dn is a series of binary sequences, expressed as $dn = \{a_{111}, a_{121}, \ldots, a^{nmk}\}$, $a^{nmk} \in \{0,1\}$, $1 \leq n \leq N$, $1 \leq m \leq M$, and $1 \leq k \leq K$. If $a^{nmk} = 1$, it indicates that task m in queue n is scheduled to cluster k. Then the Q value of the action decision output by each DNN is calculated by using formula $$Q(s, d) = \xi^d \max_{n \in N, m \in M} (T_{nm}^{comm} + T_{nm}^{comp}) + \xi^e \sum_{n \in N} (E_n^{comm} + E_n^{comp}).$$

The action decision corresponding to the minimum Q value is selected as the optimal action decision of the task set:

$$d_{opt} = \arg \min_{x \in X} Q(s, d_x)$$

Step 5: store the state space s of the current task set and the optimal action decision $d_{opt}$ as a sample (s, $d_{opt}$) in the replay memory; and when the number of samples in the replay memory reaches a threshold, randomly select mini-batch (a batch size, that is, the number of samples selected before each time of parameter adjustment) samples for model training to minimize the expected reward value, that is, minimize the task delay and the energy consumption. The ultimate optimization objective of the system is to obtain the optimal scheduling strategy. Therefore, the model was continuously trained and optimized by using the samples in the replay memory to improve model accuracy. In this case, the optimal action decision, that is, the optimal scheduling strategy, can be output after the state space of the task set is input into the model. The optimal action decision can minimize the expected reward value, that is, minimize the task delay and the energy consumption. A gradient descent algorithm optimizes parameter value $\theta_t^x$ of each DNN by minimizing the cross-entropy loss (DNN parameters include a node weight and a weight of a connection line between nodes), until the reward function converges. In the process, computation is performed based on minimized cross-entropy loss function $L(\theta_t^x) = -d_t^T \log f_{\theta_x}(s_t) - (1-d_t)^T \log(1 - f_{\theta_x}(s_t))$. In the formula, $L(\theta_t^x)$ denotes the minimized cross-entropy loss function of parameter value $\theta_t^x$ of each DNN, T denotes matrix transposition in mathematics, $d_t$ denotes the action decision finally output by using system state $s_t$ as input in time step t, and $f_{\theta_x}(s_t)$ denotes a function of parameters of X DNNs that uses system state $s_t$ as input.

Step 6: Test the scheduling model including the plurality of heterogeneous DNNs. Two parts of a simulation experiment were designed to verify effectiveness and performance of the model proposed in this embodiment. A first part is comparing and verifying key parameters of an HDLL model and observing the influence of the parameters on the optimization effect of the model. The key parameters of the model include the number of heterogeneous DNNs, a learning rate, and a batch-size (that is, the number of samples selected for one time of training. The batch-size affects the optimization degree and speed of the model, and directly affects GPU memory usage. It is better to set the batch-size to a smaller value for small GPU memory.) A second part is verification through comparison between an optimization effect in this embodiment and optimization effects of benchmark algorithms, including a random selection algorithm, a round-robin (RR) selection algorithm, multiple objective particle swarm optimization (MOPSO), a dynamic-link library (DLL) distributed learning algorithm, and a greedy algorithm. Results of the experiment shows that the model can effectively balance the two optimization targets, namely, the energy consumption and the task completion time, thereby delivering an obvious optimization effect.

Figure 3:
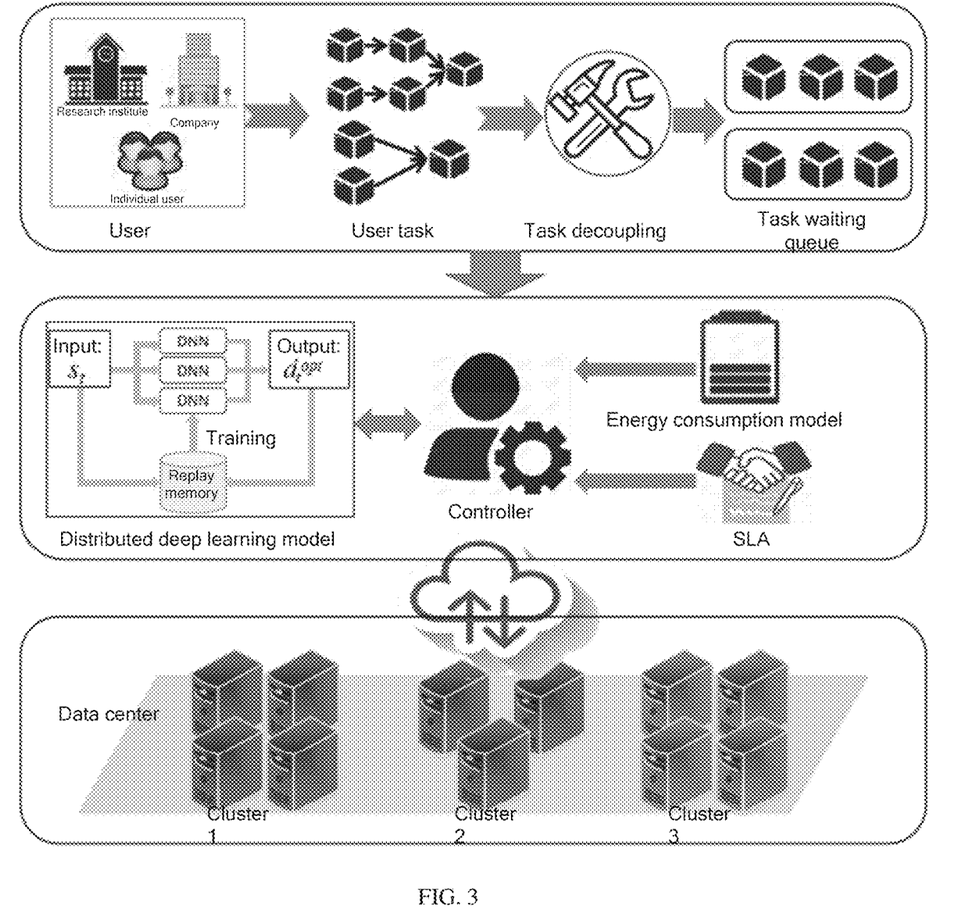
FIG. 3 is a framework diagram of a cloud system according to the present disclosure.

FIG. 3 is a framework diagram of a cloud system according to the present disclosure. As shown in FIG. 3, a scheduling module including a plurality of heterogeneous DNNs in this embodiment, that is, a distributed deep learning model in FIG. 3 is set at a second layer of the cloud system framework. The scheduling model is a basic architecture of a heterogeneous distributed deep learning model.

The cloud system framework mainly includes three layers. A first layer is a user load layer. A huge number of cloud users of diverse types results in diverse user loads. The user loads include a plurality of tasks, and there are dependencies and data transmission between the tasks. Therefore, in a task scheduling process, it is necessary to ensure an execution order of and a dependency relationship between the tasks. In the cloud system framework, a task decoupler is used at the user load layer to decouple a user load into subtasks and distribute them to a plurality of task waiting queues. In addition, it is ensured that parent tasks of the subtasks in the waiting queues are executed and the required data is transmitted, and that the tasks in the queue are atomic and can run independently. A second layer is a core layer of the entire framework, namely, a scheduling layer. This layer is responsible for task scheduling and resource supply to achieve the optimization objective of minimizing the task delay and system energy consumption. This layer includes the following four components: 1) a scheduling model: It includes a plurality of heterogeneous DNNs; 2) an energy consumption model: It includes communication consumption and computation consumption; 3) a service level agreement (SLA): It is a service agreement signed by a user and a cloud service provider, which mainly considers task completion time, that is, the task delay, including a communication delay and a computation delay of a task; and 4) a controller: It is a core component of the task scheduling layer, and responsible for coordinating various components and generating a task scheduling and resource configuration strategy to ensure the SLA and the minimum system energy consumption. A third layer is a data center layer. A large number of basic devices form a large-scale data center. Neighboring servers can be clustered into a computing cluster based on a geographic location. In terms of communication, a plurality of computing clusters are connected by an optical fiber with an extremely high transmission speed. Therefore, delays and energy consumption of data transmission between the computing clusters can be ignored. However, bandwidth and distances between cloud tasks from different users and different clusters are significantly different, and therefore are important considerations for optimization problems. In addition, due to a difference in hardware devices, the computation capability and computation power of the cluster are also key factors that affect system scheduling efficiency.

As shown in FIG. 3, in this embodiment, a two-phase scheduling framework is proposed with regard to task scheduling and resource configuration for a plurality of users and a plurality of cloud providers (the first layer in FIG. 3). The framework includes a task scheduling phase (the second layer in FIG. 3) and a resource configuration phase (the third layer in FIG. 3). Task scheduling is completed based on optimization objectives of different phases. The optimization objective of the task scheduling phase is the reward function in this embodiment. In the resource scheduling phase, the computation capability of the cluster is equally distributed to the tasks scheduled to the cluster. Different schedulers are used in different phases. The two-phase scheduling framework includes the task scheduling phase and the resource configuration phase. Task scheduling is completed based on the optimization objectives of different phases. The scheduler in the task scheduling phase is referred to as a task scheduler. The scheduler in the resource scheduling phase is referred to a resource scheduler. In the task scheduling phase, a heterogeneous distributed deep learning model is used to schedule tasks to the data center. In the resource configuration phase, a deep Q-network (DQN) model is used to complete resource configuration, that is, virtual machine resources are configured for the tasks, and the virtual machine resources are assigned to the server. Resource configuration means equally distributing the computation capability of the cluster to the tasks scheduled to the cluster, that is, each task obtains CPU cycles:

$$R_{nm}^{cpu} = \frac{C_k}{\Sigma_{n \in N} \Sigma_{m \in M} a_{nmk}}.$$

In view of a conflict between cloud service providers aiming to minimize energy consumption and users pursuing optimal service quality, the present disclosure proposes a cloud task scheduling and resource configuration method based on the DQN. The reward function designed in the method is the sum of the task delay and the energy consumption, which is defined as:

$$Q(s, d) = \xi^d \max_{n \in N, m \in M} (T_{nm}^{comm} + T_{nm}^{comp}) + \xi^e \sum_{n \in N} (E_n^{comm} + E_n^{comp}),$$

where $\xi^d, \xi^e \in [0,1]$, and $\xi^d + \xi^e = 1$. The two parameters $\xi^d$ and $\xi^e$ can be adjusted as required. When it is more expected to obtain a smaller task delay, $\xi^d$ is increased. When it is more expected to obtain lower energy consumption, $\xi^e$ is increased. The relationship between energy consumption and task completion time is balanced by adjusting reward value proportions of different optimization targets. In the present disclosure, a task delay and system energy consumption that are acceptable to both parties of the cloud service can be selected based on the result of the experiment. In this case, the reward function parameters in this state are determined accordingly. The optimization objective of the system is dynamically adjusted by adjusting weight parameters $\xi^d$ and $\xi^e$ in the reward function to meet an actual scheduling requirement.

The present disclosure proposes the cloud task scheduling and resource configuration method based on heterogeneous distributed deep learning. In the method, the plurality of heterogeneous DNNs are combined as the scheduling model of the cloud system to resolve multi-queue multi-cluster task scheduling and resource configuration problems. The optimal scheduling strategy is generated by using task delay and energy consumption minimization as the optimization objective of the cloud system. According to the application scope of the present disclosure, a cluster to which a task is distributed to can be obtained by using the steps provided in the present disclosure, so as to achieve optimized effect designed in the present disclosure.

Figure 4:
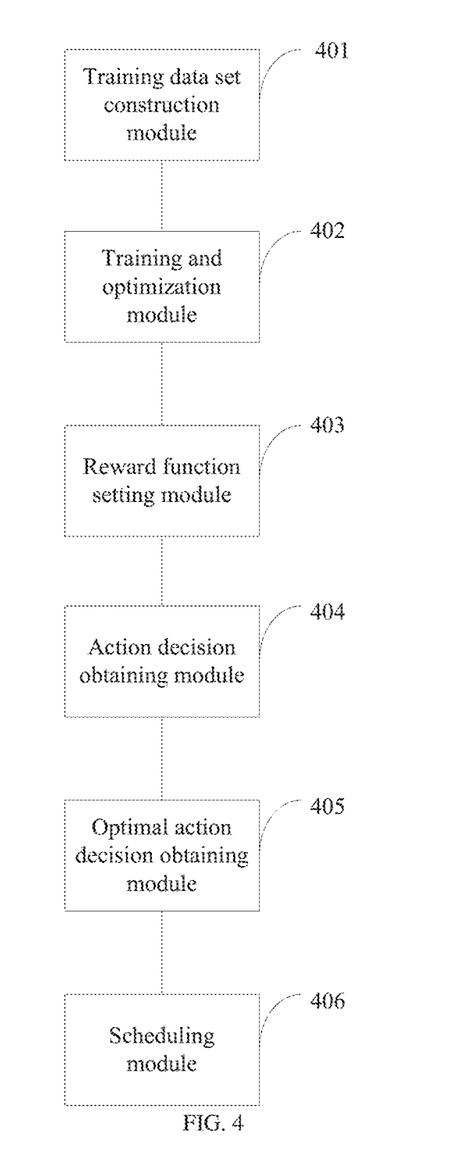
FIG. 4 is a structural diagram of a multi-queue multi-cluster task scheduling system according to an embodiment of the present disclosure.

FIG. 4 is a structural diagram of a multi-queue multi-cluster task scheduling system according to an embodiment of the present disclosure. As shown in FIG. 4, the multi-queue multi-cluster task scheduling system includes the following modules:

A training data set construction module 401 is configured to construct a training data set, where the training data set includes a state space and an action decision that are in one-to-one correspondence, the state space includes a plurality of task attribute groups in a plurality of queues arranged in sequence, and the task attribute group includes a data amount of a task and the number of CPU cycles required by the task.

A training and optimization module 402 is configured to train and optimize a plurality of parallel deep neural networks (DNN) by using the training data set to obtain a plurality of trained and optimized parallel DNNs.

A reward function setting module 403 is configured to set a reward function, where the reward function minimizes the sum of a task delay and energy consumption by adjusting a reward value proportion of the task delay and a reward value proportion of the energy consumption.

The reward function setting module 403 specifically includes the following units:

A task delay calculation unit is configured to add time consumed by a transmission process of each task and time consumed by a computation process of the task to obtain a task delay of each task.

A maximum task delay determining unit is configured to determine a maximum task delay among all task delays.

An energy consumption calculation unit is configured to add energy consumed in transmission processes of all tasks and energy consumed in computation processes of all tasks to obtain energy consumption of all tasks.

A reward value proportion setting unit is configured to set a first reward value proportion of the task delay and a second reward value proportion of the energy consumption, where the sum of the first reward value proportion and the second reward value proportion is 1.

A reward function setting unit is configured to set the reward function based on the maximum task delay, the first reward value proportion, the energy consumption, and the second reward value proportion.

The reward function setting unit specifically includes the following subunits:

A first product obtaining subunit is configured to multiply the maximum task delay and the first reward value proportion to obtain a first product.

A second product obtaining subunit is configured to multiply the energy consumption and the second reward value proportion to obtain a second product.

A reward function obtaining subunit is configured to add the first product and the second product to obtain the reward function.

An action decision obtaining module 404 is configured to input a to-be-scheduled state space into the plurality of trained and optimized parallel DNNs to obtain a plurality of to-be-scheduled action decisions An optimal action decision obtaining module 405 is configured to determine an optimal action decision among the plurality of to-be-scheduled action decisions based on the reward function for output.

The optimal action decision obtaining module 405 specifically includes the following units:

A reward function value computation unit is configured to calculate a reward function value of each to-be-scheduled action decision based on the reward function.

A minimum reward function value selection unit is configured to select a minimum reward function value among all reward function values.

An optimal action decision selection unit is configured to select a to-be-scheduled action decision corresponding to the minimum reward function value as the optimal action decision for output.

A scheduling module 406 is configured to schedule the plurality of task attribute groups to a plurality of clusters based on the optimal action decision.

In addition to the scheduling module 406, the system further includes:

A resource configuration module, configured to equally distribute the number of CPU cycles of each cluster to all the task attribute groups in the cluster.

The multi-queue multi-cluster task scheduling system further includes the following modules:

A sample storage module is configured to store the to-be-scheduled state space and the optimal action decision as a sample in a replay memory, where the action decision obtaining module, the optimal action decision obtaining module, the scheduling module, and the sample storage module are executed repeatedly until the number of samples in the replay memory reaches a threshold.

A further training and optimization module is configured to randomly select a predetermined number of samples from the replay memory, and further train and optimize the plurality of trained and optimized parallel DNNs to obtain a plurality of further trained and optimized parallel DNNs.

An updating module is configured to update the plurality of trained and optimized parallel DNNs in the action decision obtaining module to the plurality of further trained and optimized parallel DNNs.

The above embodiments are intended to exemplify that the present disclosure can be implemented or used by a person skilled in the art, and it is apparent to a person skilled in the art that the above embodiments can be conventionally modified. Therefore, the present disclosure includes, but is not limited to, the above embodiments. Any description consistent with the application document and methods, processes, and products that are identical or similar to the principles disclosed herein shall fall within the protection scope of the present disclosure.

What is claimed is:

1. A method comprising:
    step S1: training and optimizing a plurality of parallel deep neural networks (DNN) by using a training data set to obtain a plurality of trained and optimized parallel DNNs, wherein the training data set comprises training state spaces and training action decisions that are in one-to-one correspondence, each training state space comprises a plurality of attribute groups in a plurality of queues arranged in sequence for a task, and each attribute group comprises a data amount of the task and a number of CPU cycles required by the task;
    step S2: inputting a target state space into the plurality of trained and optimized parallel DNNs to obtain a plurality of target action decisions; and
    step S3: storing the target state space and an optimal action decision as a sample in a replay memory, wherein the optimal action decision is based on a reward function and is one of the plurality of target action decisions, and wherein the reward function adjusts a reward value proportion of a task delay and a reward value proportion of energy consumed to minimize a sum of the task delay and the energy consumed, wherein the energy consumed is an amount of energy consumed by a computation process of the task and a transmission process of the task, wherein the task delay is an amount of time consumed by the computation process and the transmission process, wherein a plurality of task attribute groups in the target state space is scheduled on a plurality of computer clusters based on the optimal action decision, and wherein steps S2 and S3 are repeatedly performed until a number of samples in the replay memory reaches a threshold.

2. The method according to claim 1, further comprising:
step S4: further training and optimizing the plurality of trained and optimized parallel DNNs to obtain a plurality of further trained and optimized parallel DNNs; and
step S5: updating the plurality of trained and optimized parallel DNNs in step S2 to the plurality of further trained and optimized parallel DNNs.

3. The method according to claim 1, wherein the reward function is based on a maximum task delay among a plurality of task delays, a total energy consumed by the plurality of tasks, a first reward value proportion of the maximum task delay, and a second reward value proportion of the total energy consumed, wherein the sum of the first reward value proportion and the second reward value proportion is one.

4. The method according to claim 3, wherein the reward function is based on a sum of a first product and a second product, wherein the first product is based on the maximum task delay and the first reward value proportion, and the second product is based on the total energy consumption and the second reward value proportion.

5. The method according to claim 1, wherein the optimal action decision is based on a minimum reward function value of a plurality of reward function values, wherein each reward function value corresponds to a target action decision.

6. The method according to claim 1, wherein the number of CPU cycles is equally distributed to all task attribute groups in the plurality of computer clusters after the plurality of task attribute groups in the target state space is scheduled to the plurality of computer clusters based on the optimal action decision.

7. A system comprising:
a training and optimization module, configured to train and optimize a plurality of parallel deep neural networks (DNN) by using a training data set to obtain a plurality of trained and optimized parallel DNNs, wherein the training data set comprises training state spaces and training action decisions that are in one-to-one correspondence, each training state space comprises a plurality of attribute groups in a plurality of queues arranged in sequence for a task, and each attribute group comprises a data amount of the task and a number of CPU cycles required by the task;
an action decision obtaining module, configured to input a target state space into the plurality of trained and optimized parallel DNNs to obtain a plurality of target action decisions; and
a sample storage module, configured to store the target state space and an optimal action decision as a sample in a replay memory, wherein the optimal action decision is based on a reward function and is one of the plurality of target action decisions, and wherein the reward function adjusts a reward value proportion of a task delay and a reward value proportion of energy consumed to minimize a sum of the task delay and the energy consumed, wherein the energy consumed is an amount of energy consumed by a computation process of the task and a transmission process of the task, wherein the task delay is an amount of time consumed by the computation process and the transmission process, wherein a plurality of task attribute groups in the target state space is scheduled on a plurality of computer clusters based on the optimal action decision, and wherein the action decision obtaining module and the sample storage module are executed repeatedly until the number of samples in the replay memory reaches a threshold.

8. The system according to claim 7, further comprising:
a further training and optimization module, configured to further train and optimize the plurality of trained and optimized parallel DNNs to obtain a plurality of further trained and optimized parallel DNNs; and
an updating module, configured to update the plurality of trained and optimized parallel DNNs in the action decision obtaining module to the plurality of further trained and optimized parallel DNNs.

9. The system according to claim 7, wherein the reward function is based on a maximum task delay among a plurality of task delays, a total energy consumed by the plurality of tasks, a first reward value proportion of the maximum task delay, and a second reward value proportion of the total energy consumed, wherein the sum of the first reward value proportion and the second reward value proportion is one.

10. The system according to claim 9, wherein the reward function is based on a sum of a first product and a second product, wherein the first product is based on the maximum task delay and the first reward value proportion, and the second product is based on the total energy consumption and the second reward value proportion.

11. The system according to claim 7, wherein the optimal action decision is based on a minimum reward function value of a plurality of reward function values, wherein each reward function value corresponds to a target action decision.

12. The system according to claim 7, wherein the number of CPU cycles is equally distributed to all task attribute groups in the plurality of computer clusters after the plurality of task attribute groups in the target state space is scheduled to the plurality of computer clusters based on the optimal action decision.

* * * * *